United States Patent Office 3,114,723
Patented Dec. 17, 1963

3,114,723
LOW-TEMPERATURE EXPANSION OF LIQUID ORGANIC POLYSULFIDE POLYMER WITH HYDRAZINE-TYPE COMPOUNDS AND AN OXIDATIVE CURATIVE
Byron A. Hunter, Woodbridge, Conn., assignor to United States Rubber Company, New York, N.Y., a corporation of New Jersey
No Drawing. Filed Nov. 14, 1960, Ser. No. 68,690
10 Claims. (Cl. 260—2.5)

This invention is concerned with cellular "polysulfide rubbers" and with a process for producing the same. More particularly, the invention relates to a method involving mixing a liquid organic polysulfide rubber with an oxidative curative for such rubber along with hydrazine or a hydrazine derivative, the resulting liquid mixture being capable of simultaneously curing and expanding at ambient temperatures to form a solid, cured and expanded rubber.

The term "polysulfide rubber" is intended to embrace those synthetic rubbers that have come to be known as "Thiokol rubbers" and includes the materials described, for example, in U.S. Patent 2,466,963, Patrick et al., April 12, 1949, and at Ind. Eng. Chem. 43, 324–328 (1951). They may be described as polyalkylene polysulfides, or polythiopolymercaptans. They are also referred to as olefin polysulfide rubbers. Such organic polysulfide rubbers are available under the trade name of "Thiokol" from the Thiokol Corporation and they are usually reaction products of sodium sulfide (or polysulfides) with halogenated organic compounds such as ethylene dichloride, propylene dichloride, di-2-chloroethyl formal, 1,2,3-trichloropropane, or the like.

It is well known that these liquid organic polysulfide polymers can be cured to a solid, rubbery state by the action of oxidizing agents, whether inorganic oxidizing agents such as iodine or oxygen-containing salts, e.g., the chromates, manganates, permanganates, molybdates, etc. or oxides or peroxides, especially those of metals such as lead dioxide, tellurium dioxide, sodium peroxide, as well as per compounds such as potassium persulfate, hydrogen peroxide or the like, or whether organic oxidizing materials, including peroxides, hydroperoxides, and the like, such as benzoyl peroxide, dicumyl peroxide, cumene hydroperoxide, etc., as well as quinone dioxime, 2,4,6-trinitrobenzene, m-dinitrobenzene, etc. Oxidizing materials apparently react with sulfhydryl groups (—SH) in the polymer, removing hydrogen to form water, and leaving a free valence on the sulfur atom to serve as a site for formation of a cross-linkage with a similar site formed in the same way on another molecule of the polymer. Thus, upon addition of an oxidizing agent to the liquid organic polysulfide polymer, a curing reaction takes place, even at room temperature, leading to the formation of a solid, cured material resembling a vulcanized rubber. This curing reaction may be speeded up by application of heat, if desired. The invention is particularly adapted to those polysulfide rubbers which are liquid in the uncured state and which can be cured to a solid rubbery state in the presence of oxidizing agents such as lead dioxide, tellurium dioxide, cumene hydroperoxide, etc.

In particular the invention involves the application of certain gas-forming agents to produce a cellular structure in the polysulfide rubber, said gas-forming agents being peculiarly adapted to the expansion of said rubber without the use of externally applied heat. Specifically, the invention resides in the discovery that cellular rubbery compositions can be produced without the application of heat by introducing certain hydrazine compounds into a liquid polysulfide polymer and curing the polymer in the conventional manner in the presence of an oxidizing curing agent.

The production of cellular rubbers by the use of chemical blowing agents is well known. Prior art procedures depend upon the decomposition of heat-sensitive organic or inorganic substances to produce gaseous products capable of forming a cellular structure within the rubbery mass. Normally, the blowing agent is incorporated into the rubber composition at temperatures well below the decomposition temperature of the blowing agent, and the rubber-blowing agent mix, together with the necessary curing agents, is then heated to curing temperature in a suitable mold or oven, whereupon the blowing agent decomposes as the rubber composition is cured. In such procedures it is essential that the rate of cure and the rate of decomposition of the blowing agent be such that the rubber composition attains sufficient strength to retain the gas within the mass. At the same time it is required that the rubber remain in an expandable state at the decomposition temperature of the blowing agent. In any case, heat is required for the curing and blowing of the rubber.

In the present invention the expansion of liquid polysulfide rubbers is achieved without necessity for the application of heat by incorporating a hydrazine compound into a liquid-type polysulfide rubber composition and treating the composition with an oxidizing curing agent conventionally used in the curing of such liquid polysulfide rubbers. The oxidizing curing agent when utilized in my process performs the double function of concomitantly curing the rubber and oxidatively decomposing the hydrazine blowing agent to produce nitrogen gas as an expanding agent in the rubber. In contrast to the teachings of the prior art concerned with the production of expanded rubber, little or no heat is necessary to bring about the production of gaseous products from the blowing agents utilized in my invention. As I have indicated above, the formation of gas in my process is achieved by the oxidative decomposition of the hydrazine compound by the action of the oxidizing curatives employed in the curing of the liquid polysulfide rubber composition.

I am aware that hydrazine compounds similar to those employed in my present invention have been previously utilized as blowing agents for rubber. In U.S. Patent 2,621,161 (issued to myself and others, December 9, 1952) certain hydrazine salts were employed in a conventional vulcanization procedure to produce cellular rubber. The use of certain organic sulfonhydrazide compounds as blowing agents in rubber compositions at elevated temperatures has been disclosed in my British Patent No. 686,814, July 3, 1950, as well as in U.S. Patents Nos. 2,552,065, Schoene, May 8, 1951; 2,626,280, Hunter, January 30, 1953; and 2,626,933, Loeber et al., January 27, 1953. In the procedures described in these patents the hydrazine compound is incorporated into the rubber composition containing the conventional curing agents and subjected to temperatures exceeding the decomposition temperature of the blowing agent in order to cure and expand the rubber. The unique feature of my present invention resides in the discovery that little or no heat is required to expand liquid polysulfide polymers when my hydrazine blowing agents are used in conjunction with the special oxidizing curatives normally employed in the curing of said polysulfide polymers.

Although heat is ordinarily not required to bring about the formation of gas in the practice of my invention, the time of cure can be substantially reduced, if desired, by applying moderate heat (generally less than 100° C.) to the liquid polymer composition containing the blowing agents of my invention. The degree of heating, however, will be substantially less than that required for gaseous decomposition of the blowing agents in the absence of the special oxidizing curatives employed in my process.

The hydrazine compounds which are used in accordance with the invention to expand the liquid organic polysulfide rubber containing an oxidizing agent include hydrazine itself and derivatives of hydrazine which decompose under the conditions existing in the polysulfide rubber during the curing process. Hydrazine itself (whether hydrated or not) is suitable. Similarly, I may use the organic salts of hydrazine (hydrazinium salts), including salts of hydrazine with carboxylic acids in general, whether monocarboxylic, dicarboxylic or higher polycarboxylic, and whether aliphatic or carbocyclic. Examples of such hydrazine salts are as follows:

Hydrazinium formate
Hydrazinium acetate
Hydrazinium propionate
Hydrazinium butyrate
Hydrazinium hexanoate
Hydrazinium octanoate
Hydrazinium decanoate
Hydrazinium laurate
Hydrazinium stearate
Hydrazinium oleate
Hydrazinium benzoate
Hydrazinium p-tert. butyl benzoate
Hydrazinium oxalate
Hydrazinium tartrate I may also use substituted hydrazines, especially hydrocarbon-substituted hydrazines, in which category I include compounds of the type $$\overset{H}{R N N H_2}$$

where R is an organic radical, whether aliphatic (e.g. alkyl or equivalent substituted alkyl such as hydroxy-alkyl, especially where the alkyl group contains from 1 to 12 carbon atoms) or aromatic (e.g. phenyl, naphthyl, etc.), or organic salts of compounds of such formula with acids such as those indicated above. Examples of such compounds are alkyl hydrazines, hydroxy-alkyl hydrazines, aryl hydrazines, and the like, or their salts, such as n-Octylhydrazine
Beta-hydroxyethylhydrazine
Phenylhydrazine
Phenylhydrazinium oxalate Similarly, in the category of substituted hydrazines, especially hydrocarbon-substituted hydrazines, I include compounds of the type $R_2NNH_2$, where R is an organic radical as previously indicated, as well as organic salts of such compounds with acids as previously indicated. Examples of such compounds are dialkylhydrazines, and diarylhydrazines, and the like, or their salts, such as, N,N-dimethylhydrazine
N,N-dioctylhydrazine
N,N-dimethylhydrazinium oxalate Also, I may use compounds of the type $$\overset{}{R \underset{\underset{O}{\|}}{C} NHNH_2}$$

where R is an organic radical as previously defined. Examples are

Acetohydrazide
Propiohydrazide
Butyrohydrazide
Benzhydrazide and similar acyl hydrazines.

Also useful are compounds of the type $$\overset{H}{RSO_2NNH_2}$$

(R being as previously defined), such as

Benzenesulfonhydrazide
p-Toluenesulfonhydrazide
p,p'-Oxybis(benzene sulfonhydrazide)
Methanesulfonhydrazide
Butanesulfonhydrazide
Dodecanesulfonhydrazide
1,4-butanebis(sulfonhydrazide)

In general, any of the sulfonhydrazides, such as those disclosed in the patents mentioned above, may be used.

Similarly useful are the sulfonyl semicarbazides, such as compounds of the type $RSO_2NHNHCONH_2$ (R again being the organic radical), among which may be mentioned Benzenesulfonyl semicarbazide
p-Toluenesulfonyl semicarbazide
p,p'-Oxybis(benzenesulfonyl semicarbazide)
Methanesulfonyl semicarbazide
1,4-butanebis(sulfonyl semicarbazide)

I may also use, among others, such hydrazine compounds as

Semicarbazide ($NH_2NHCONH_2$)
Carbohydrazide ($NH_2NHCONHNH_2$)
Hydrazinium carbazate ($NH_2NHCOOH \cdot N_2NNH_2$)

In general any hydrazine compound capable of undergoing oxidative decomposition to gaseous products in the presence of an oxidizing agent at moderate temperatures is operable in my process.

Not all the hydrazine compounds I have tested are equally efficient in expanding polysulfide polymers. In general, I have found the inorganic salts of hydrazine to be relatively ineffective in comparison to the hydrazine salts of organic acids. Further, I have discovered that many hydrazine compounds not only produce gas for expansion of the polymer but also act as activators of the cure. Some hydrazine compounds react very rapidly, and expansion and curing begin while the materials are being mixed (in such cases, I may find it advantageous to keep the mixture cold, e.g. at a temperature of about 10° C.). Thus, I have observed that anhydrous hydrazine is very rapid in its action when used in combination with lead dioxide or cumene hydroperoxide curatives. This property may be advantageous when rapid cures are desired. On the other hand I find that when I use an acid salt of hydrazine the action is sufficiently delayed to permit leisurely mixing before expansion and cure set in. Furthermore, I have discovered that different acids produce salts of hydrazine that vary greatly in the rate at which expansion and cure of the liquid polymer takes place. This is a valuable discovery in that for any particular application the proper acid salt of hydrazine can be selected to give the expansion and cure rate desired.

By utilizing selected hydrazine compounds and selected curatives, one can obtain expanded polymer in times varying from a few minutes to several hours. In many cases it is convenient to allow the polysulfide composition containing the blowing agent and the curatives to stand at ambient temperature (e.g. 10° C. to 35° C.) overnight or for several days. During this period expansion and cure slowly take place, and a stable cellular product is produced. A particularly valuable application of this technique will be found in formed-in-place caulking and gasketing, pavement joints, and the like.

Among the hydrazine compounds which I have found to be very effective expanding agents for polysulfide liquid rubbers are the organic sulfonhydrazides. Among these, p,p'-oxybis(benzenesulfonhydrazide) ("Celogen") is a commercially available blowing agent that is very useful in the practice of my invention.

The quantity of hydrazine compound used as an expanding agent is not critical and can be varied over wide limits depending upon the degree of expansion desired. Generally, the quantity of the blowing agent used will be between 0.01 and 10% of the polysulfide rubber used. However, greater or less than the quantities indicated can be used, and it is not intended to limit the invention to the quantities of the blowing agent described. Likewise, the amount of curing (oxidizing) agent may be adjusted over a considerable range to provide proper cure and to effectively decompose the blowing agent. In any case the amount of oxidizing agent employed may ordinarily be the same as that conventionally used for curing the polysulfide rubber. It will be understood that the amounts of blowing agent and of curative oxidizing agent will vary with the polysulfide polymer used and with the properties desired in the expanded rubber.

As indicated previously, a variety of oxidizing curatives may be used, the preferred material depending upon the type of liquid polysulfide used, the time of cure desired, and upon the color requirements to be met. Typical curing agents include lead dioxide, tellurium dioxide, cumene hydroperoxide, and iodine. Other curatives such as quinone dioxime, 2,4,6-trinitrobenzene, m-dinitrobenzene, etc., may be used—generally in the presence of activators such as diphenylguanidine, sulfur, etc. In general basic substances such as tris (dimethylamino methyl) phenol ("DMP-30") activate the cure whereas acidic substances tend to retard the cure. Driers such as lead octoate and manganese or cobalt salts are useful in the curing of the polysulfide rubber. If desired, combinations of oxidizing agents may be employed to give desired characteristics to the expanded product.

The polysulfide rubber composition may also include other compounding ingredients such as carbon black, titanium dioxide, clays, or other fillers as well as other compounding ingredients normally employed in the formulation of liquid polysulfide polymers. Incorporation of other polymeric substances such as epoxy resins, butadieneacrylonitrile polymers, phenolic resins, rubber latex, and so forth, may be desirable to impart special properties to the product. Combinations of different types of polysulfide rubbers will present advantages in certain applications.

The blowing agents of the invention can be incorporated in the liquid polysulfide polymer and the mixture stored until the time of application. Although heat is generally not required to effect the cure of the polymer, the composition can be subjected to moderately elevated temperatures (generally not more than about 100° C.) in cases when more rapid curing of the rubber is desired. The degree of heating, however, will be substantially less than that required for gaseous decomposition of the blowing agent in the absence of the oxidizing curatives employed in my process. As is the case in current commercial practice in the art of producing rubbery vulcanizates from liquid polysulfide polymers, the curing agent will be added just prior to use. The curing agent thus will perform the double function of curing the rubber and oxidizing the blowing agent to produce nitrogen gas, resulting in the formation of an expanded and cured product.

The following examples, in which all quantities are expressed on a weight basis, will serve to illustrate the practice of the invention in more detail.

*Example 1*

The polysulfide rubber employed in this and subsequent examples was a condensation product of 98 molepercent bis-beta-chloroethyl formal and 2 mol-percent of 1,2,3-trichloropropane with sodium polysulfide, having an equivalent weight of 1710 by mercaptan end group analysis, and having a viscosity of 560 poises at 30° C. as measured by means of a Brookfield viscometer. Such a liquid material is commercially available under the name "Thiokol LP-2." 100 parts of the foregoing polymer was mixed with 30 parts of semi-reinforcing carbon black ("Pelletex") and 1 part of stearic acid. The resulting mixture is known as "Thiokol T-13-A liquid polymer. To this was added 0.44 g. of hydrazinium formate. The materials were thoroughly mixed, and then 5.0 g. of a paste consisting of 50 parts of lead dioxide, 45 parts of dibutyl phthalate, and 5 parts of stearic acid ("Thiokol Accelerator C-5") was stirred into the mix. The thoroughly blended mixture was allowed to stand overnight at room temperature. Next day the product was found to be cured to a well expanded rubber exhibiting a fine, uniform cellular structure. The density of the product was found to be 0.79. A similarly prepared rubber omitting the hydrazinium formate exhibited no cellular structure, and the measured density was 1.41.

*Example 2*

Example 1 was repeated, doubling the quantity of hydrazinium formate (to 0.88 g.). Considerably greater expansion was obtained in this case, and the density of the cured product was 0.49.

*Example 3*

Example 1 was repeated, substituting 0.44 g. of p,p'-oxybis(benzenesulfonhydrazide) ("Celogen") for the hydrazinium formate. After standing at room temperature overnight a cured cellular rubber was obtained which had a density of 0.86.

*Example 4*

Following the general procedure described in Example 1, the following hydrazine compounds were added (1% by weight) to 44 g. of Thiokol T-13-A liquid polymer (see Example 1) and cured with 5.0 g. of Thiokol Accelerator C-5 at room temperature. The densities of the cured polymer samples are indicated in the table.

| Hydrazine compound: | Density of product |
|---|---|
| Hydrazinium benzoate | 0.95 |
| Hydrazinium tartrate | 1.29 |
| Hydrazinium isobutyrate | 0.57 |
| No blowing agent | 1.41 |

*Example 5*

Fifty grams of "Thiokol T-13-A" was mixed with 0.5 gram of a number of hydrazine compounds, and 10 grams of Thiokol Accelerator C-5 was added. After thorough mixing the samples were placed in an oven at 70° C. overnight. The densities of the resulting cellular rubbers are shown in the following table.

| Hydrazine compound: | Density |
|---|---|
| p,p'-Oxybis(benzenesulfonhydrazide) | 0.71 |
| p,p'-Oxybis(benzenesulfonyl semicarbazide) | 1.05 |
| Benzenesulfonyl semicarbazide | 0.79 |
| Hydrazinium oxalate | 0.82 |
| Hydrazinium benzoate | 0.91 |
| Hydrazinium p-tert. butyl benzoate | 0.73 |
| 1-phenylsemicarbazide | 0.78 |
| No blowing agent | 1.35 |

Example 6

Thiokol LP-2 liquid polymer (44 grams) was treated with a number of hydrazine compounds. These mixtures, after thorough mixing, were then treated with cumene hydroperoxide and then with dimethyl amino methyl phenol (DMP-30). The proportions of the chemicals used are indicated in the following table. After standing overnight at room temperature, the densities of the resulting products were measured. The data obtioned are shown in the table:

| Hydrazine Compound | Cumene Hydroperioxide | DMP-30 | Density |
|---|---|---|---|
| p,p'-Oxybis(benzenesulfonhydrazide) (.44 g.) | 6 g | 30 drops | 0.80 |
| Hydrazinium formate (.44 g.) | 5 g | 1 g | 0.50 |
| Hydrazinium formate (.88 g.) | 6 g | 20 drops | 0.42 |
| Hydrazinium acetate (.44 g.) | 6 g | 22 drops | 0.72 |
| Hydrazinium propionate (.44 g.) | 6 g | 22 drops | 0.60 |
| Hydrazinium propionate (.88 g.) | 6 g | 22 drops | 0.38 |
| Hydrazinium butyrate (.44 g.) | 6 g | 22 drops | 0.74 |
| Hydrazinium hexanoate (1.0 g.) | 5 cc | 22 drops | 0.38 |
| Hydrazinium laurate (0.88 g.) | 6 g | 22 drops | 0.82 |
| Hydrazinium stearate (1.0 g.) | 5 cc | 22 drops | 0.71 |
| Hydrazinium oleate (1.0 g.) | 6 g | 22 drops | 0.54 |
| Hydrazinium benzoate (.44 g.) | 6 g | 20 drops | 0.70 |
| Acetyl hydrazine (.44 g.) | 6 g | 22 drops | 0.85 |
| No blowing agent | 6 g | 22 drops | 1.19 |

Each of the above products except that produced with no blowing agent exhibited a well expanded cellular structure.

Example 7

Forty-four gram portions of Thiokol LP-2 polymer were mixed with a number of hydrazine compounds (the amounts used are shown in the table below). Into each of these mixtures was stirred 5 grams of Thiokol Accelerator C-5. The samples were allowed to stand at room temperature overnight to complete the expansion and cure. Densities of the cured samples are shown in the table.

Hydrazine compound: Density
- Hydrazinium formate _____ 0.41
- Hydrazinium acetate (heated to 100° C. for 2 hours) _____ 0.52
- Hydrazinium propionate _____ 0.56
- Hydrazinium decanoate _____ 0.55
- Hydrazine hydrate _____ 0.81
- Acethydrazide _____ 0.41
- Hydrazinium carbazate _____ 0.60
- B-hydroxyethylhydrazine _____ 0.64
- Unsymmetrical dimethylhydrazine _____ 0.57
- No blowing agent _____ 1.27

Example 8

Forty-four grams of Thiokol LP-2 was mixed with a number of hydrazine compounds (0.44 gram). Then 5 grams of Thiokol Accelerator C-5 was mixed in and the mixture placed in a 70° C. oven for two hours. The densities of the cured and expanded samples are given in the following table.

Hydrazine compound: Density
- Benzhydrazide _____ 0.54
- Carbohydrazide _____ 0.69
- Semicarbazide _____ 0.55
- Butyrohydrazide _____ 0.56
- p,p'-Oxybis(benzenesulfonhydrazide) _____ 0.96
- p,p'-Oxybis(benzenesulfonyl semicarbazide) _____ 1.12
- No blowing agent _____ 1.27

Example 9

One-half gram of hydrazinium formate was added to fifty grams of Thiokol LP-2. Then 5 grams of tellurium dioxide was mixed in, and the mixture placed in a 70° C. oven overnight. A cellular rubbery product was obtained which had a density of 0.60. In a similar experiment in which one gram of hydrazinium formate was used, the density of the resulting product was 0.29.

Example 10

Fifty grams of Thiokol LP-32 was mixed with 0.5 gram of benzenesulfonhydrazide and then 7.5 grams of Thiokol Accelerator C-5 was mixed in. After standing at 70° C. overnight, the cured product showed a density of 0.63.

Example 11

Several hydrazine compounds (0.5 gram) were added to 50-gram portions of Thiokol LP-33, and then 7.5 grams of Thiokol Accelerator C-5 was added to each mix. The mixtures were placed in a 70° C. oven overnight. Densities of the resulting samples are listed in the following table.

Hydrazine compound: Density
- Acetyl hydrazine _____ 0.75
- Propionyl hydrazine _____ 0.76
- p-Toluenesulfonhydrazide _____ 0.78
- Unblown sample _____ Over 1.23

Any conventional liquid polysulfide rubber, such as any one of those disclosed in the patents mentioned previously, along with any conventional oxidative curative, may be substituted in the foregoing examples with generally similar results.

Having thus described my invention, what I claim and desire to protect by Letters Patent is:

1. A method of making an expanded, cured rubber product comprising incorporating into a liquid organic polysulfide polymer, which is a polyalkylene polysulfide containing sulfhydryl groups, an oxidative curative for said polymer selected from the group consisting of iodine, lead dioxide, tellurium dioxide, sodium peroxide, potassium persulfate, hydrogen peroxide, benzoyl peroxide, dicumyl peroxide, cumene hydroperoxide, quinone dioxime, 2,4,6-trinitrobenzene, and m-dinitrobenzene, and, as a blowing agent, a hydrazine compound selected from the group consisting of hydrazine, hydrazinium salts of carboxylic acids, hydrocarbon-substituted hydrazines, hydroxy-alkyl hydrazines, hydrocarbon-substituted hydrazinium salts of carboxylic acids, acyl hydrazines, sulfonhydrazides, semicarbazide, sulfonyl semicarbazides, carbohydrazide, and hydrazinium carbazate, and subjecting the resulting mixture to a temperature within the range of from 10° C. to 100° C. whereby the said hydrazine-type compound decomposes under the influence of the said oxidative curative to produce gaseous products capable of expanding said mixture, and the composition simultaneously cures to produce an expanded, cured rubber product.

2. A method as in claim 1 in which the said oxidative curative is lead dioxide.

3. A method as in claim 1 in which the said hydrazine compound is a sulfonhydrazide.

4. A method as in claim 3 in which the said sulfonhydrazide is p,p'-oxybis(benzenesulfonhydrazide).

5. A method as in claim 1 in which said hydrazine compound is a hydrazinium salt of a carboxylic acid.

6. A method as in claim 5 in which said hydrazinium salt is hydrazinium propionate.

7. A method as in claim 1 in which said hydrazine compound is N,N-di-hydrocarbon-substituted hydrazine.

8. A method as in claim 7 in which said dihydrocarbon-substituted hydrazine is N,N-dimethylhydrazine.

9. A method as in claim 1 in which said hydrazine compound is an hydroxy-alkyl hydrazine.

10. A method as in claim 9 in which said hydroxy-alkyl hydrazine is beta-hydroxy-ethyl hydrazine.

(References on following page)

References Cited in the file of this patent

UNITED STATES PATENTS

| | | | |
|---|---|---|---|
| 2,621,161 | Kulp et al. | Dec. 9, | 1952 |
| 2,626,933 | Lober et al. | Jan. 27, | 1953 |
| 2,828,299 | Von Glahn et al. | Mar. 25, | 1958 |
| 2,873,481 | Semegen | Feb. 17, | 1959 |

OTHER REFERENCES

"Thiokol"—Thiokol Corporation, Trenton, New Jersey, received in Patent Office June 19, 1948, Technical Service Bulletin No. 103, pages 1-4.

Andreith et al.: "The Chemistry of Hydrogine," John Wiley & Sons, Inc., New York. Copyright, 1951, pages 115-134.

Degering: "An Outline of Organic Nitrogen Compounds," University Lithographers, Ypsilanti, Michigan, page 382, 1945.